United States Patent [19]

Kawai et al.

[11] Patent Number: 4,891,878
[45] Date of Patent: Jan. 9, 1990

[54] METHOD OF MAKING A MAGNETIC HEAD

[75] Inventors: Yoshihiko Kawai, Kyoto; Kazuaki Koyama; Yasuda, Isao, both of Katano, all of Japan

[73] Assignee: Sanyo Electric Co., Ltd., Moriguchi, Japan

[21] Appl. No.: 304,286

[22] Filed: Jan. 31, 1989

Related U.S. Application Data

[62] Division of Ser. No. 97,316, Sep. 14, 1987, Pat. No. 4,807,075.

[30] Foreign Application Priority Data

Mar. 16, 1984 [JP] Japan ................................ 59-51323
Mar. 19, 1984 [JP] Japan ................................ 59-52722

[51] Int. Cl.$^4$ .............................................. G11B 5/42
[52] U.S. Cl. ........................................ 29/603; 65/43; 360/122; 360/126; 360/127
[58] Field of Search ................... 29/603; 360/119, 122, 360/125–127; 65/43

[56] References Cited

FOREIGN PATENT DOCUMENTS 117723 8/1980 Japan .

Primary Examiner—Hall Carl E.
Attorney, Agent, or Firm—Armstrong, Nikaido, Marmelstein, Kubovcik & Murray

[57] ABSTRACT

A magnetic head comprises a main core (41) made of sendust material and a pair of reinforcing cores (45) for holding the main core so that the main core is sandwiched between the pair of reinforcing cores, in which the main core is adhered to the pair of reinforcing cores by glass material through transition metal layers (48) formed on both sides of the main core. The main core is comprised of a pair of core halves (41a, 41b) having their respective transition metal layers formed on their contacting surfaces, the pair of core halves with transition metal layers (25) being adhered to each other by glass material (29).

4 Claims, 7 Drawing Sheets

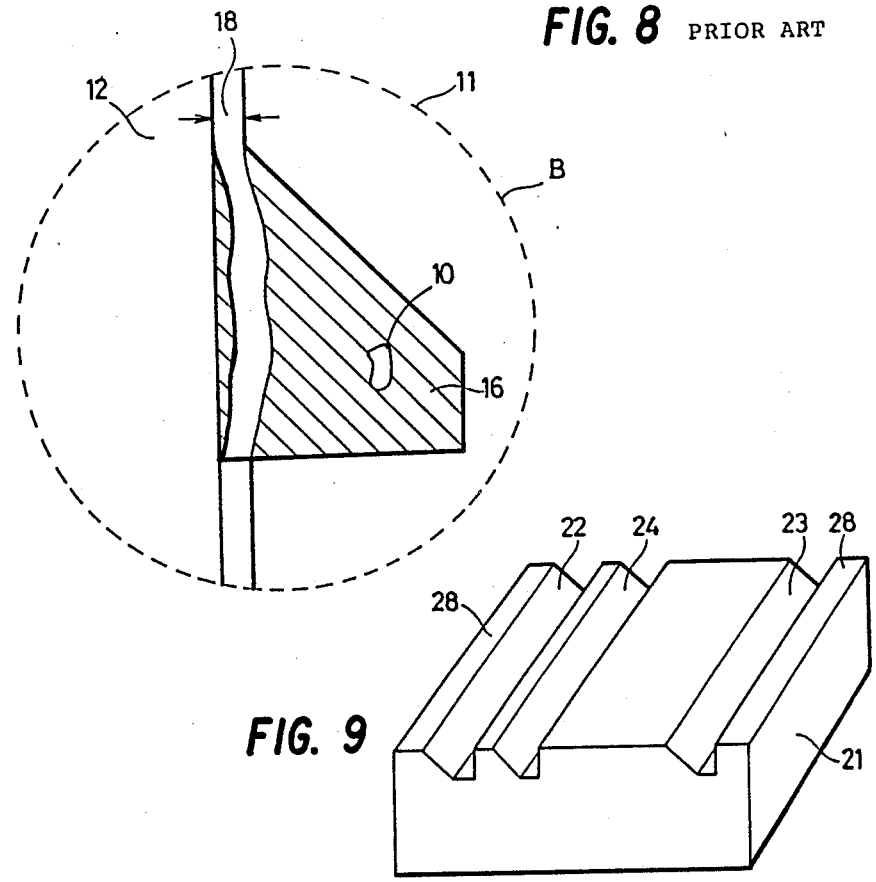
FIG. 8 PRIOR ART
FIG. 9
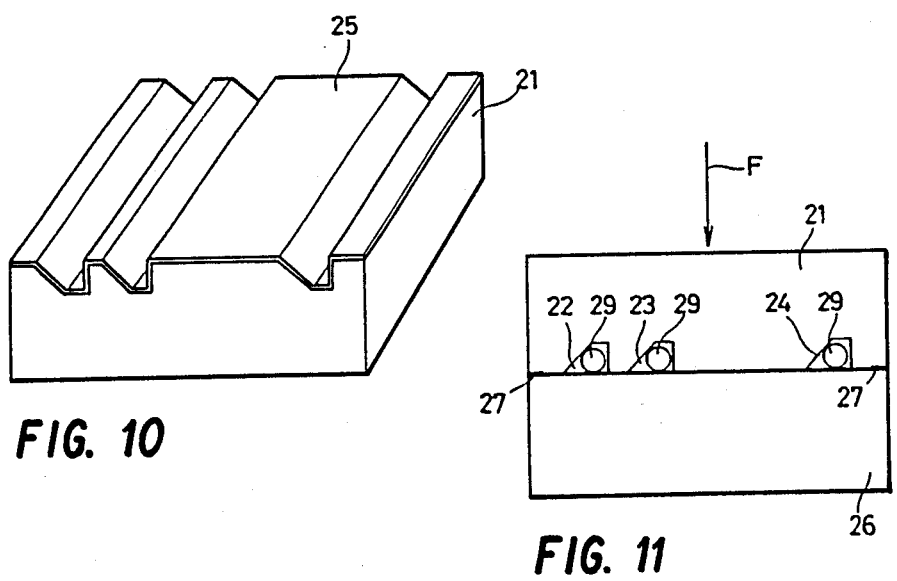
FIG. 10
FIG. 11

FIG. 12
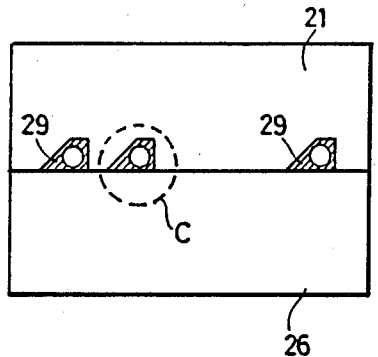
FIG. 13
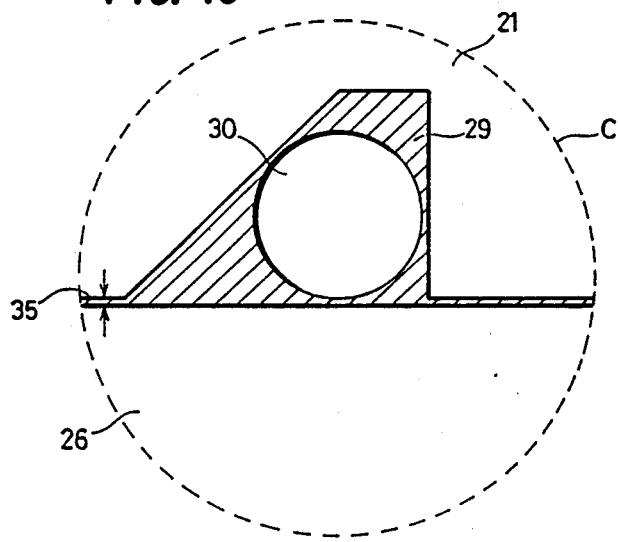
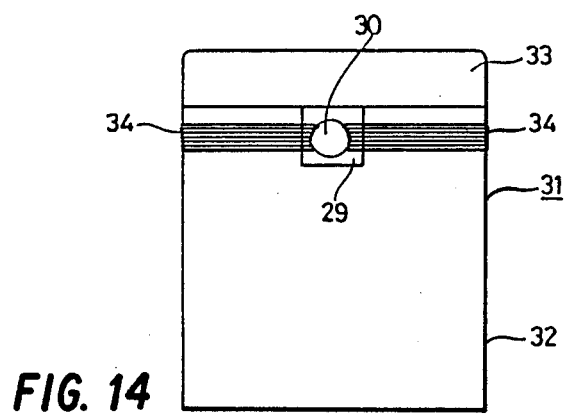
FIG. 14
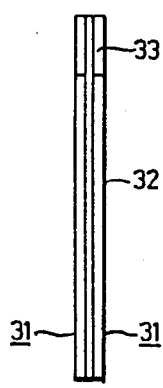
FIG. 15

FIG. 16A
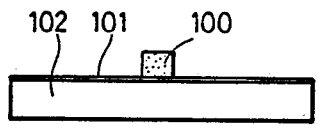
FIG. 16B
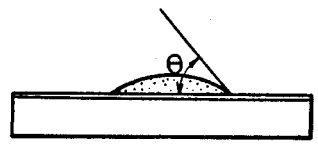
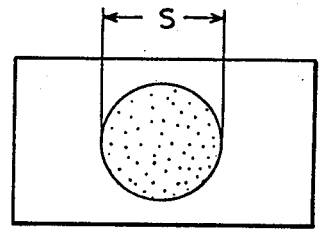
FIG. 16C
FIG. 17A
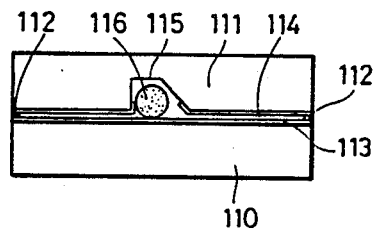
FIG. 17B
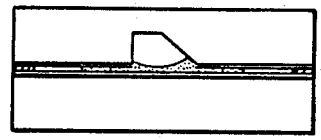
FIG. 17C
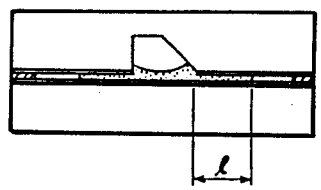

METHOD OF MAKING A MAGNETIC HEAD

This application is a division of application Ser. No. 097,316, filed Sept. 14, 1987, now U.S. Pat. No. 4,807,075, which is a division of application Ser. No. 709,732 filed Mar. 8, 1985 now abandoned.

BACKGROUND OF THE INVENTION

1. Field of the Invention

The present invention relates a magnetic head and, particularly, relates to a magnetic head for use in video applications such as a video tape recorder (VTR), 8 mmVTR (for example, see NIKKEI ELECTRONICS 1983.5.23, pages 111-124), an electronic still camera (magnetic disc video recording and reproducing apparatus: for example, IEEE TRANSACTIONS ELECTRONICS Vol. CE - 28, No. 3, August 1982, "The Electronic Still Camera A New Concept In Photography").

2. Description of the Prior Art

A magnetic recording apparatus for recording and reproducing information through the use of a magnetic medium has been playing an increasing important role in the information processing oriented society. Such apparatus has been widely used in many technical fields such as audio, video and digital machines. Of these, since the advent of video tape recorder for recording and reproducing a video for broadcasting, it has been being remarkably developed and has been commercially available as a so-called home video as well as a broadcasting video. In addition, recently, the 8 mm video tape recorder and the electronic still camera have been being developed. A major basis for such remarkable development largely depends on advancement of high density magnetic recording technique using a magnetic head and tape.

As far as a magnetic tape for high density magnetic recording is concerned, there is a tendency that material used for such magnetic tape progressively changes from originally used magnetic materials of oxide, such as $\gamma\text{-FE}_2\text{O}_3$, $\text{CO} \cdot \gamma - \text{FE}_2\text{O}_3$, to magnetic materials of metal, such as Fe fine particles and Co—Ni evaporation film, which have substantially strong magnetic characteristic. Following such tendency, there is also a tendency that material for such magnetic head changes from magnetic material of oxide including the presently used Mn—Zn ferrite single crystal to magnetic materials of metal, such as sendust, amorphous ribbon and Co—Zr—Nb thin film.

The magnetic head playing an important role for the above described high density magnetic recording comprises, in general, a main core formed corresponding to a track width and a pair of reinforcing cores for reinforcing the main core by sandwiching the main core between them. The main core comprises a pair of core halves which are joined to each other with a gap length. In order to record information on a magnetic tape with high density, it is necessary to make a recording frequency higher, in other words, to make the wavelength smaller, in which case a minimum wavelength ($\lambda_{min}$) is determined by a magnitude of the gap length (G). The minimum wavelength is approximately equal to twice the gap length ($\lambda_{min} \approx 2G$). For example, assuming that the minimum wavelength is 0.5 $\mu$m, the gap length of the magnetic head must be made to be 0.25 $\mu$m. Accordingly, very precise machining technique is required and improvement of material suitable for magnetic recording is also required. On the other hand, recording on the magnetic tape is made in response to a leakage flux leaking to the magnetic tape through the gap length, out of magnetic flux formed between a pair of core halves. If and when a wavelength is short, a curve of leakage flux becomes abrupt, which is suitable for high density magnetic recording. Accordingly, it is an important factor for high density magnetic recording how such leakage flux is made abrupt. In other words, how a pair of core halves constituting a main core are adhered to each other is a significant problem.

Conventionally, a pair of core halves made of sendust are adhered to each other by using silver solder material (Ag—Cu alloy). However, since the silver solder partially diffuses into the core halves, joining force is increased whereas permeability of the sendust is decreased, and hence a curve of a leakage flux is broadened, which does not meet a requirement for an abrupt leakage flux curve. Therefore, another approach of using glass material has been proposed instead of a silver solder material. Unlike silver solder material, glass material is little diffused and the permiability of sendust is not adversely affected by glass. Therefore, a leakage flux curve becomes abrupt and hence, it is theoretically clear that performance can be enhanced from a view point of high density recording. Of course, permiability in the vicinity of the core gap largely affects a reproducing output even in the course of reproduction. However, since the glass comprises an oxide whereas the sendust comprises metal material, joining ability between the glass and sendust is not so good. Accordingly, there has been a dilemma between use of silver solder material and use of glass material, as an adhesive for core halves made of sendust alloy.

Now, referring to FIGS. 1 to 8, a magnetic head of the prior art will be described in the following, in a more particular manner.

FIG. 1 is a perspective view showing a main core for use in a magnetic head, the magnetic head comprising the main core made of alloy material and a pair of reinforcing cores for holding the main core so that the main core is sandwiched between the reinforcing cores, and FIG. 2 is an exploded perspective view of a conventional magnetic head. Such magnetic head is disclosed in the Japanese Patent Laying-Open Gazette No. 222427/1983, for example. Such a magnetic head comprises a main core 1 and a pair of reinforcing cores 5 for holding the main core 1 by sandwiching the main core 1 between the pair of reinforcing cores 5, as shown in FIG. 2. The main core 1 comprises, as shown in FIG. 1, a pair of core halves 1a, 1b made of magnetic material of alloy such as sendust, which are joined to each other by adhering means 2, 3 such as silver solder material. A gap length 4 is formed between the core halves through such joining, in the front of the main core 1. On the other hand, as shown in FIG. 2, the reinforcing cores 5, 5 comprised of a portion 6 of magnetic material such as ferrite and portion 7 of non-magnetic material such as soda glass are joined to the main core 1, from both sides thereof, respectively, so that a magnetic head is formed.

The basic structure of magnetic head was described in the foregoing. A conventional method for forming a main core for use in such magnetic head comprises, as shown in FIG. 3, (1) forming, in a contacting surface of one of a pair of sendust wafers 11 and 12 grooves 13 and 14 where glass sticks 16 are inserted and melted and a groove 15 where coils are wrapped later, by means of machining process, (2) providing a mirror grinding on contacting surfaces or gap-length-forming surfaces of these wafers 11 and 12 and thereafter, (3) contacting both wafers and inserting the glass sticks 16 into the grooves 13, 14 and 15 and then heating and melting the glass sticks 16 with a load F being applied. As a result, as shown in FIGS. 4 and 5, the melted glass permeates through the contacting surfaces of the wafers 11 and 12, so that a core block can be formed. Incidentally, before contacting the above described wafers 11 and 12, a film 17 of $SiO_2$ having a thickness of 0.2 $\mu$m for forming a gap length is partially formed, as a spacer, on a margin of a surface of one of the wafers 11 and 12, so that a core block with a gap length can be formed. When a final main core is completed, the portion of the film 17 of $SiO_2$ as a spacer is removed. As described previously, since a glass generally comprises an oxide whereas alloy material comprises metal, joining ability between both materials is not so good and hence the melted glass does not fully permeate through the gapped portion as formed in advance. Therefore, the wafers 11 and 12 are partially adhered to each other. For this reason, mechanical strength thereof becomes weak and hence, if and when the core block is sliced into main core chips, as shown by lines 19 in FIG. 6, so that a main core chip as shown in FIG. 7 can be obtained, the glass 16 partially interposed in the gap, which is now solidified, is broken as shown in FIG. 8, so that the gap length 18 expands from 0.2 $\mu$m to approximately 5 m. In addition, since, while glass 16 is being melted, the melted glass 16 does not fully permeate through gap and hence only a small cavity 10 is produced, there is also defect that it takes much time to form a hole for windings in the groove 5. Furthermore, there is a fear that in case of magnetic head for video applications, having extremely small track width, a curve or separation of core halves may be caused in forming a predetermined gap length (track width) by means of grinding, if and when a joining force between core halves is so small. Furthermore, the magnetic head formed by the above described conventional method is less reliable, like degradation of reproducing output due to change of gap length, since the joining force between two core halves is so small.

On the other hand, in order to make a final magnetic head stronger, it is also important to increase a joining force between a main core and a pair of reinforcing cores. Conventionally, an organic resin or non-organic adhesive is mainly used for adhering the main core to the pair of reinforcing cores so that a magnetic core is structured in a sandwiched manner. However, since the working temperature of the organic resin or non-organic adhesive is near normal temperature, such joining method has several defects in several respects. Thus, from the point of view of increasing reliability of joined portions, joining by glass material has been used. However, as described in the foregoing, the glass material comprises an oxide, whereas alloy material for main core comprises metal material, the joining ability between these is not so good, resulting in poor joining force and incomplete contact.

SUMMARY OF THE INVENTION

Briefly stated, the present invention is directed to a magnetic head comprising a main core formed by a pair of core halves made of metal material, and a pair of reinforcing cores for holding the main core by sandwiching the main core between the reinforcing cores, in which at least one of a joining between the pair of core halves forming the main core and a joining between the main core and the pair of reinforcing cores is made by glass material through a transition metal layer. Preferably, the transition metal layer comprises a titanium film, a chromium film or a tungsten film and the metal material for the main core preferably comprises a sendust alloy. The glass material preferably comprises a phosphate-contained glass and, more particularly, the phosphate-contained glass comprises a phosphate lead contained glass or a phosphate barium contained glass. The gap length between the core halves for the main core is preferably less the 0.3 $\mu$m. In addition, the reinforcing core is comprised of a magnetic material portion and a non-magnetic material portion provided in the front of the magnetic material portion.

In accordance with another aspect of the present invention, there is provided a method for manufacturing a magnetic head comprising a main core made of metal material and a pair of reinforcing cores for holding the main core by sandwiching the main core between the reinforcing cores, the manufacturing method comprising the steps of forming transition metal layers on both surfaces of the main core, and heating and melting glass material disposed on the side portions of the main core and the reinforcing cores, with the reinforcing cores being pressed to both surfaces of the main core on which the transition metal layers are formed, so that the melted glass can permeate between the reinforcing cores and the transition metal layers. Preferably, the transition metal layer is formed by means of ion plating process.

In accordance with a further aspect of the present invention, there is provided a method for manufacturing a magnetic head comprising a main core made of metal material and a pair of reinforcing cores for holding the main core by sandwiching the main core between the reinforcing cores, the method comprising the steps of forming transition metal layers on both surfaces of the main core, respectively; forming at least one groove on surfaces of the reinforcing cores which contact with the main core, respectively; pressing and holding the reinforcing cores to both surfaces of the main core on which the transition metal layers are formed; inserting a glass stick into the groove; and, melting the glass stick, so that the melted glass permeates between the reinforcing cores and the transition metal layers formed on the main core. Preferably, the transition metal layer is formed by means of ion plating process.

In accordance with a still further aspect of the present invention, there is provided a method for manufacturing a magnetic head including a main core comprised of a pair of core halves made of metal material, having a gap length formed by glass material between contacting surfaces of the core halves, the method comprising the steps of preparing a pair of wafers made of metal material; forming at least one groove on a surface of one of said wafers; forming transition metal layers on the surface with the groove of one of said wafers, and a surface of other wafer contacting with the groove formed surface of one wafer; pressing and holding the pair of wafers so that the surfaces on which transition metal layers are formed, respectively, are contacted to each other; inserting a glass stick into the groove formed on one wafer, with the pair of wafers being pressed and held; heating and melting the inserted glass stick so that the melted glass can permeate between the transition metal layers of the contacting surfaces of the pair of wafers; and, thereafter, slicing the pair of joined wafers and grinding for completeness. Preferably, the transition metal layers are formed by means of ion plating process.

Accordingly, a primary object of the press invention is to provide a magnetic head in which a joining between a main core and a pair of reinforcing cores and-/or a joining between a pair of core halves forming the main core are securely achieved using glass material, and a method for manufacturing thereof.

A primary advantage of the present invention is that a joining between a main core and a pair of reinforcing cores which structure a magnetic head and/or a joining between a pair of core halves forming the main core can be made strong, so that mechanical and thermal reliability can be increased and also an electrical reproducing characteristic can be improved.

Another advantage of the present invention is that, since transition metal layers are deposited on contacting surfaces of two wafers forming core halves for a main core, an melting glass can sufficiently permeate between the transition metal layers, so that a joining force can be increased thereby to eliminate a change of gap length and a separation of two core halves during slicing and grinding processes. Accordingly, in a particularly case of a video head having an extremely small track width, a reliability can be remarkably displayed with respect to grinding process. In addition, since glass can sufficiently permeate between the transition metal layers, relatively large cavity can be made in the groove after the glass is melt, and hence such cavity can be effectively used as a winding hole.

These objects and other objects, features, aspects and advantages of the present invention will become more apparent from the following detailed description of the. present invention when taken in conjunction with the accompanying drawings.

BRIEF DESCRIPTION OF THE DRAWINGS

FIG. 8 is an enlarged view of a portion B encircled in dotted line in FIG. 7;

FIG. 9 is a perspective view of one of wafers for a main core structuring a magnetic head of the present invention;

FIG. 10 is a drawing of the wafer of FIG. 7 on which a transition metal layer is formed;

FIG. 11 is a sectional view showing a manner in which two wafers are contacted to each other and pressed;

FIG. 12 is a sectional view showing a manner after a glass stick inserted into a groove formed on the wafer is melted;

FIG. 13 is an enlarged view showing a portion of C encircled in a dotted line of FIG. 12;

FIG. 14 is a plan view of a magnetic head of the present invention;

FIG. 15 is a sectional view of a magnetic head shown in FIG. 12;

FIGS. 16A, B and C are drawings indicating experimentation for studying wettability between a magnetic material of alloy and a glass material;

FIGS. 17A, B and C are drawings indicating the steps of experimentation for studying glass permeation distance between gaps;

DESCRIPTION OF THE PREFERRED EMBODIMENTS

Figure 1:
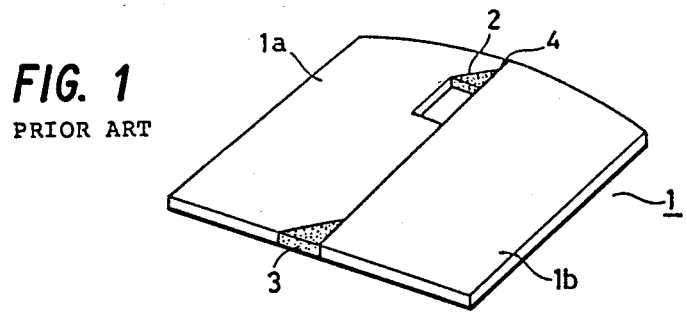
FIG. 1 is a perspective view showing a shape of a main core constituting a part of a magnetic head.
Figure 2:
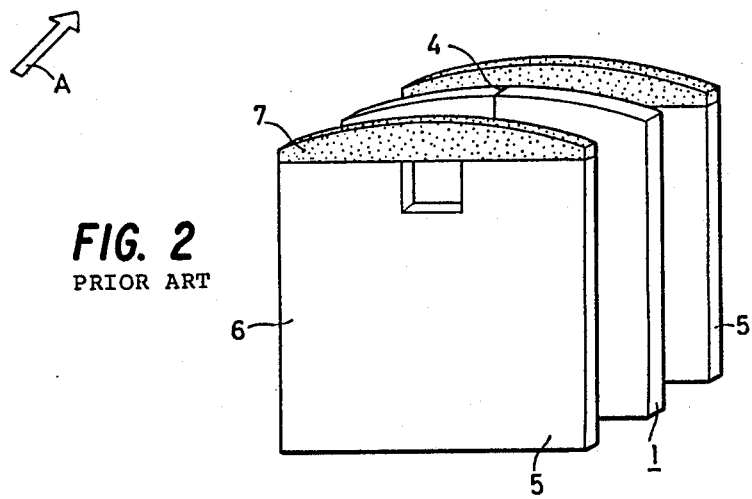
FIG. 2 is an exploded perspective view of a conventional magnetic head.
Figure 3:
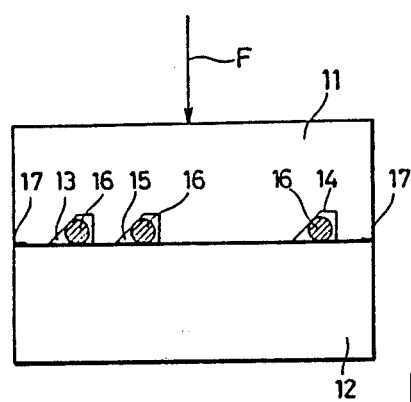
FIG. 3 is a side view showing wafers before a main core structuring a conventional magnetic head is formed and FIG. 4 is a perspective view thereof.
Figure 4:
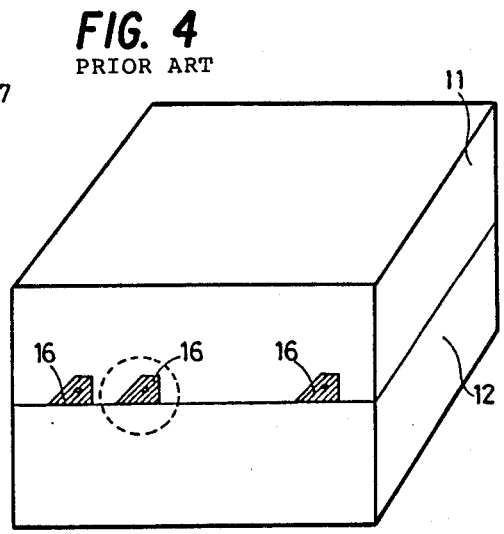
Figure 5:
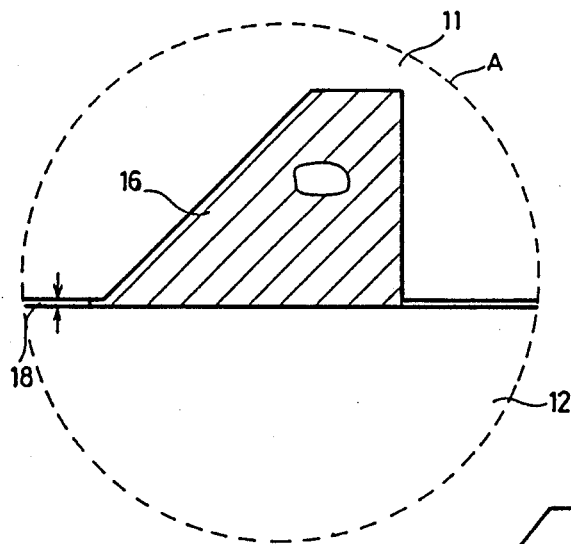
FIG. 5 is a drawing showing a part of FIG. 4 in an enlarged manner.
Figure 6:
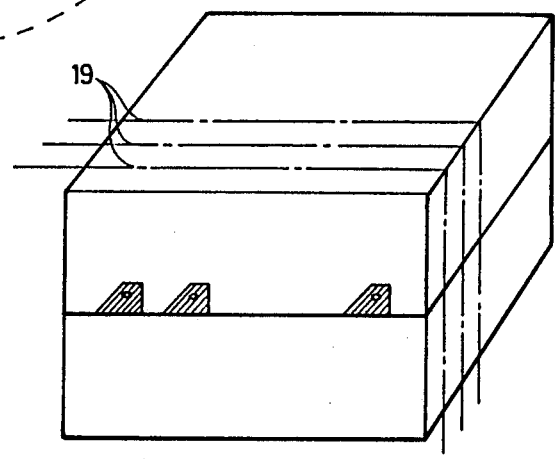
FIG. 6 is a perspective view showing a manner of slicing main cores from wafers.
Figure 7:
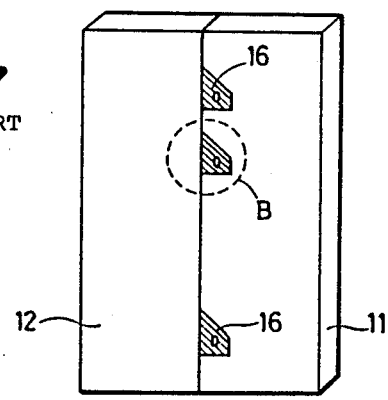
FIG. 7 is a perspective view showing a main core after sliced.

FIG. 9 is a perspective view showing a wafer prepared for a main core constituting a magnetic head. The wafer 21 is formed with grooves 22 and 23 provided for melting a glass stick and a groove 24 used for a later coil winding. Then, as shown in FIG. 10, a transition metal layer 25 of titanium (Ti) film is formed, by means of well-known ion plating process, on a surface of the wafer 21 on the side where the grooves are provided. Chromium, molybdenum or tungsten may be used instead of titanium. Such transition metal layer 25 is also formed on a surface of other sendust wafer 26 to be contacted to the wafer 21, as shown in FIG. 11. It is noted that a film 27 of $SiO_2$ for determining a gap length (see reference numeral 35 in FIG. 13) as a magnetic head are provided in advance, as a spacer, in the end portions 28 (see FIG. 9). As shown in FIG. 11, both of the wafers 21 and 26 are attached to each other and glass sticks 29 are inserted into the grooves 22, 23 and 24, with a load F of 2 Kg being applied. Then, as shown in FIG. 12, with such load F being applied, the inserted glass sticks 29 are melted and consequently, as shown in FIG. 13, the melted glass 29 easily permeates between the transition metal layers formed on the contacting surfaces of the wafers 21 and 26. This is because the melting glass is familiar with transition metal and hence the melting glass can easily extend on or along the transition metal, although the glass does not become familiar with metal or alloy. Preferably, glass material comprises phosphate contained glass such as a phosphate lead contained glass and phosphate barium contained glass, the linear expansion coefficient of which is similar to that of sendust. In such a way, glass material sufficiently permeates between contacting surfaces of the wafers and a relatively large cavity 30 which is almost a true circle in cross section, is formed in each of the grooves 22, 23 and 24. Therefore, as far as the groove 24 used for windings is concerned, such cavity can be utilized as a hole for windings, which is advantageous in manufacturing process. Subsequently, the block thus joined and formed is sliced in a conventional manner so that many main core chips can be obtained. A main core is completed by providing a desired grinding process to each of the main core chips. The main core is sandwiched between a pair of reinforcing cores 31, 31 which are comprised of magnetic material portion 32 such as ferrite, and non-material portion 33 such as glass, as shown in FIGS. 14 and 15. Then, grinding process for providing some rounding and for adjusting gap depth is applied to the corners of the front end of the non-material portion 33. Thereafter, coils 34 are wound, as shown in FIG. 14, so that a magnetic head is completed.

FIG. 16 is a diagram showing experimentation for studying wettability between magnetic material of alloy and glass material. First, as shown in FIG. 16A, glass material 100 is disposed on a thin film 101 formed on a sendust alloy 102 and then, is heated. The glass is shown in FIG. 16B as being melted. The letter "$\theta$" indicates a wetting angle in FIG. 16B and letter "S" indicates a wetting area in FIG. 16C. By using the experimentation shown in FIG. 16, wettability is evaluated with respect to kinds of intervening film between the surface of sendust alloy and glass material. Borosilicate glass is used as glass material. Heating condition is 40 minutes in 750° C. The result is illustrated in Table 1.

TABLE 1

| Intervening Film | Wetting Area (S) | Wetting Angle ($\theta$) |
| --- | --- | --- |
| non | 30.17 mm$^2$ | 17° 21' |
| Ti evaporated film 750Å | 66.05 mm$^2$ | 5° 00' |
| Cr evaporated film 750Å | 41.04 mm$^2$ | 11° 12' |

It has been found from the result that provision of intervening films of titanium evaporated film or chromium evaporated film increase wettability and joining ability. Particularly, titanium film is superior.

In addition, a further wettability is evaluated, with respect to phosphate barium contained glass, by the above described experimentation. Heating condition is 15 minutes at 618° C. The result is illustrated in Table 2.

TABLE 2

| Intervening Film | Wetting Area (S) | Wetting Angle ($\theta$) |
| --- | --- | --- |
| non | 34.37 mm$^2$ | 27° 48' |
| Ti evaporated film 750Å | 45.27 mm$^2$ | 15° 58' |

From the result of the Table 2, effectivity of titanium film can be confirmed to be excellent.

It should be noted that thermal expansion coefficients of the aboved described borosilicate glass and phosphate barium glass are $130 \times 10^{-7}$ and $143 \times 10^{-7}$, respectively. Since thermal expansion coefficient of sendust alloy is about $145 \times 10^{-7}$, it is found that the phosphate barium contained glass is more suitable for joining between sendust and sendust, that is, joining between a pair of core halves. On the other hand, as described subsequently, borosilicate glass is suitable for joining between a main core comprised of sendust material and a pair of reinforcing cores comprised of ferrite material (thermal expansion coefficient thereof is 90 - $100 \times 10^{-7}$).

FIG. 17 is a drawing showing experimentation for studying how melted glass permeates between gaps. A sendust wafer 110 and another sendust wafer 111 having a groove 115 on the surface thereof are abutted to each other, with a gap which is formed by a spacer 112 of SiO$_2$. Thin films 113, 114 are formed on the surfaces of the wafers 110 and 111, respectively. Glass material 116 is inserted into the groove 115. FIG. 17B shows the state after heated. Distance of permeation is shown by "e" in FIG. 17C. In the experimentation shown in FIG. 17, a phosphate barium contained glass is used as glass material and working temperature is 750° C. The result is illustrated in Table 3.

TABLE 3

| Intervening film | Heating Time Period | Distance of Permeation (l) | Joining Ability |
| --- | --- | --- | --- |
| non | 15 minutes | 0 μm | x |
| non | 80 minutes | 5 μm | x |
| Ti evaporated film | 15 minutes | 80 μm | o |
| Ti evaporated film | 80 minutes | 1000 μm | o |

The Table 3 indicates that provision of titanium evaporated film is suitable for permeation of melted glass.

Now, joining of main core and a pair of reinforcing cores will be described in the following.

Figure 18:
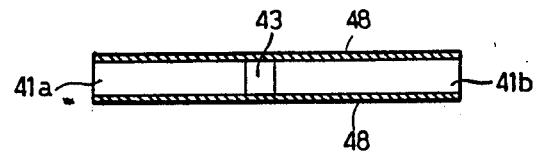
FIG. 18 is a rear view of a main core constituting a magnetic head of the present invention.
Figure 20:
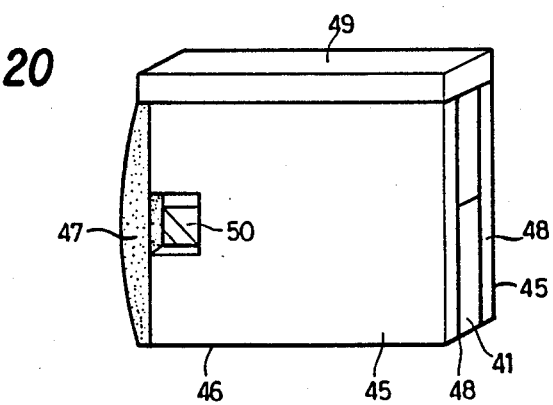
FIG. 20 is a perspective view showing a method for manufacturing a magnetic head of one embodiment of the present invention.

The basic feature of joining the main core and the reinforcing cores resides in the point that transition metal layers such as titanium film are formed on both surfaces of the main core. FIG. 18 is a rear view of a main core with transition metal layers as viewed from A direction shown in FIG. 1, for example. The structure of the main core itself is substantially the same as that in FIG. 1. More particularly, core halves 41a and 41b are joined to each other by a conventional silver solder 43 or by glass material through transition metal layer as described in the above described embodiment. Titanium films 48 are formed on both surfaces of the main core. For example, the chip size of the main core is 2.5 × 2.5 × 0.025 (thickness) (mm). The transition metal layers 48, 48 are formed to a thickness of 500 Angstrom by means of ion plating process. In such a way, after the transition metal layers are formed on both surfaces of the main core, a pair of reinforcing cores 45, 45 are disposed on both surfaces of the main core 41 and load of 2 Kg is applied from direction B—B, so that the main core 41 is held by the reinforcing cores, with load of 2 kg being applied from the direction B—B. The reinforcing core 45 is of a size of 2.5 × 2.5 × 0.1 (thickness) (mm) and has the same shape as that of the main core 41, but different thickness. The magnetic head assembly as pressed and held is laid, as shown in FIG. 20, and glass material 49 is then disposed on the side portion of the assembly and is heated in a vacuum heating furnace for two hours at 750° C. As a result, the glass 49 is melted and permeates between the transition metal layers 48 and the reinforcing cores 45, so that the transition metal layers 48 and the reinforcing cores 45 are joined to each other. The glass comprises a silicon dioxide of 50 weight %, boric acid of 15 weight %, aluminum of 10 weight % and sodium oxide of 20 weight %, which are main constituent elements, and calcium oxide etc, which is auxiliary constituent element. A softening point of the glass is 550° C. and thermal expansion coefficient is $130 \times 10^{-7}$ mm/° C. Since the softening point of the glass is fully lower than softening point of the transition metal layer, the transition metal layers 48, 48 are never melted in the course of joining process. The magnetic head thus joined is taken out from the vacuum heating furnace and unnecessary glass material is removed by grinding process and the like. Thereafter, coil is wound through a widing hole 50 so that a magnetic head is completed. The magnetic head is attached to a head base (not shown) as well-known in the field and is presented for use in a video tape-recorder.

Figure 21:
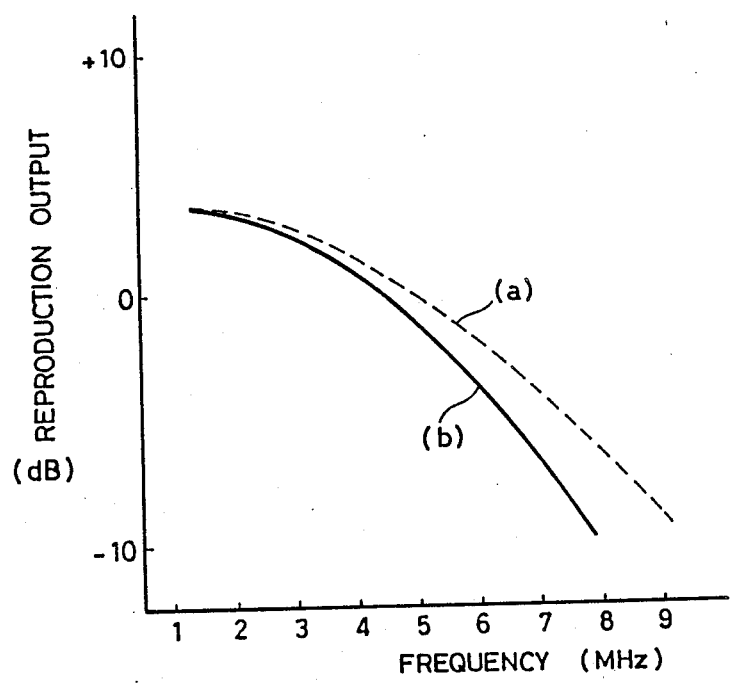
FIG. 21 is a drawing explaining an advantage of one embodiment of the present invention.

A magnetic head thus produced in the above described embodiment was subjected to (i) a drop test from 1m, and (ii) a thermal cycle test (−30° C. through 85° C. for 10 minutes). As a result, the drop test indicated that two out of twenty magnetic heads thus produced are separated into the main core and the reinforcing cores and the thermal cycle test indicated that one out of thirty magnetic heads is separated. To the contrary, in a conventional magnetic head, (i) the drop test indicated that sixteen out of twenty magnetic heads are separated into the main core and the reinforcing cores and (ii) the thermal cycle test indicated that twenty-eight out of thirty magnetic heads are separated into the main core and thereinforcing cores, which means that the conventional magnetic head is not so good with respect to mechanical and thermal aspect. The magnetic head in accordance with the present embodiment and the conventional magnetic head are subjected to a temperature and humidity cycle (JIS5024) five times and the resulting reproducing outputs are compared. The result is shown in FIG. 21. In FIG. 21, comparing the present embodiment (a) with a conventional one (b), the reproducing outputs in both cases in a lower frequency range are almost the same whereas, in a higher range of frequency, the reproducing outputs of the embodiment (a) is higher than that of the conventional one (b). This is because in the conventional magnetic head, joining force between the main core and the reinforcing cores becomes weaker and the distance between the main core and the reinforcing cores becomes larger and thus reproducing efficiency decreases.

Figure 19:
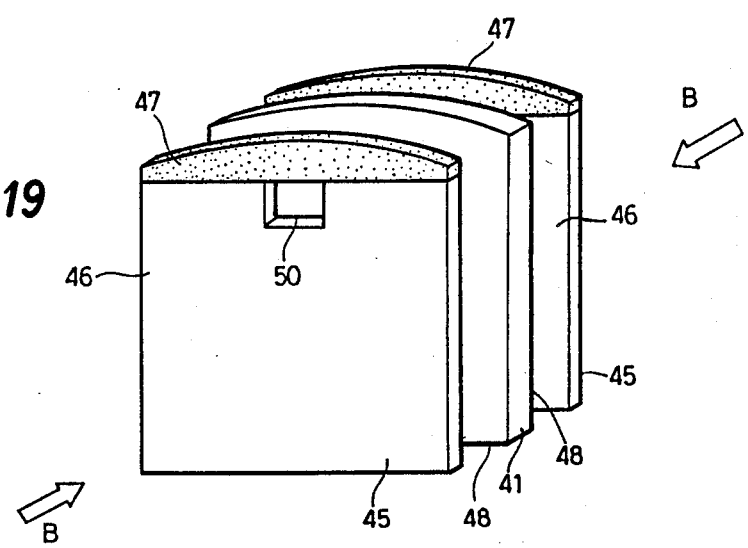
FIG. 19 is an exploded perspective view of a magnetic head of the present invention.
Figure 22:
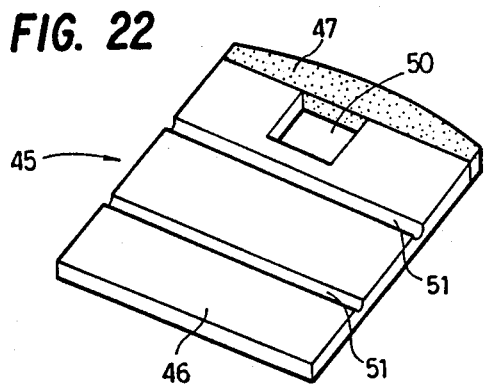
FIG. 22 is a perspective view of a reinforcing core used for explaining another embodiment of manufacturing method of the present invention.

Another embodiment is provided in which, instead of titanium film (transition metal layer) in the above described embodiment shown in FIGS. 18 to 20, chromium film is used and grooves 51 shown in FIG. 22 are provided in an inner surface of the reinforcing core 45 for the purpose of improving permeation of adhesive glass material, so that the glass material shown in FIG. 20 permeate through the grooves 51 and permeates between contacting surfaces through the grooves 51 when the glass material 49 is melted. As a result of (i) a drop test of 1m and (ii) a thermal cycle test, no defective magnetic head is caused and extremely preferable result was obtained.

Incidentally, although, as shown in FIG. 22, the grooves 51 are formed in the reinforcing cores so that the melted glass permeates from the side portion of the cores, it is possible to insert glass sticks into the grooves 51 so that the melted glass directly permeates between contacting surfaces.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for manufacturing a magnetic head having a main core formed by bonding opposing surfaces of a pair of core halves made of alloy material to each other for forming a gap using glass material, and a pair of reinforcing core halves made of nonmagnetic material for reinforcing the main core so that the main core is sandwiched between the pair of reinforcing cores, comprising the steps of:
    forming grooves on at least a surface of one of a pair of wafers made of alloy material;
    forming transition metal layers both on the surface of said one wafer with said grooves and on the surface of the other wafer contacting with said surface having said grooves of said one wafer;
    pressing and holding said pair of wafers so that the surfaces with said transition metal layers contact each other;
    inserting glass sticks into said grooves formed on said one wafer, said one pair of wafers being pressed and held, and heating and melting said inserted glass stick to thereby permeate melted glass between contacting surfaces of said pair of wafers so that the pair of wafers are bonded to each other;
    slicing and grinding the pair of bonded wafers to thereby form main cores each main core having a gap and two major opposed surfaces perpendicular to said gap;
    forming transition metal layers on both said major surfaces of said main core;
    pressing reinforcing cores made of non-magnetic material to both said major surfaces of said main core with said transition metal layers and holding said reinforcing cores to both said major surfaces of said main core; and thereafter
    heating glass material from at least one side of said main core and said reinforcing cores to melt said glass material to thereby permeate said melting glass between said reinforcing cores and said transition metal layers so that said reinforcing cores are bonded to both said major surfaces of said main core.

2. A method in accordance with claim 1, further comprising the step of respectively forming at least one groove on surfaces, contacting with said main core, of said reinforcing cores.

3. A method for manufacturing a magnetic head, in accordance with claim 1 including the step of
    forming at least one groove on surfaces of said reinforcing cores, contacting with said main core, so that said melted glass can permeate between the contacting surface of said reinforcing cores and said main core through said groove.

4. A method in accordance with claim 1, wherein said transition metal layers are formed by means of ion plating process.

* * * * *